July 19, 1932.  R. SLAMA  1,867,771

PASTEURIZING APPARATUS

Filed Sept. 19, 1930   3 Sheets-Sheet 1

INVENTOR:
Richard Slama
by Murray C. Boyer
Atty.

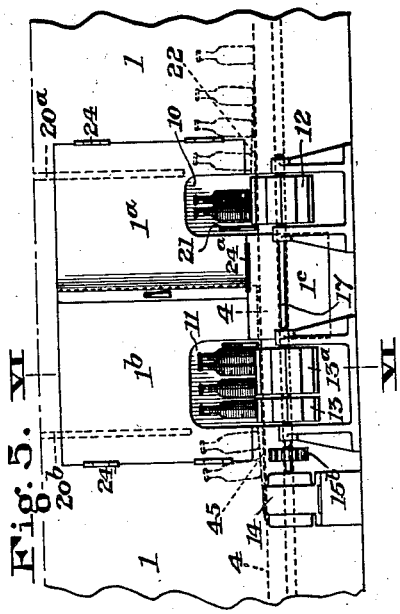

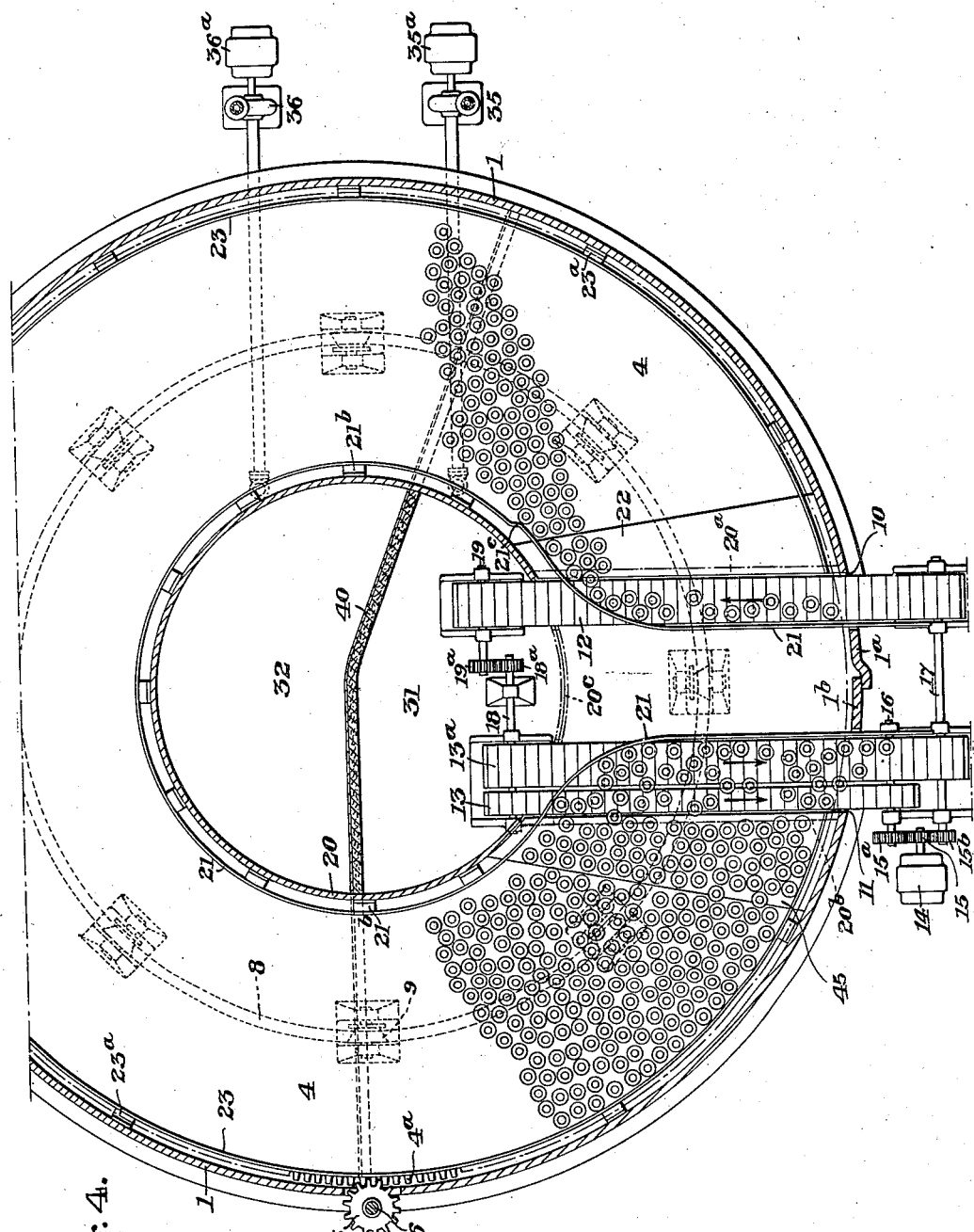

Patented July 19, 1932

1,867,771

UNITED STATES PATENT OFFICE

RICHARD SLAMA, OF PHILADELPHIA, PENNSYLVANIA, ASSIGNOR OF ONE-HALF TO AUGUST R. ROESCH, OF GENEVA, NEW YORK

PASTEURIZING APPARATUS

Application filed September 19, 1930. Serial No. 483,022.

My invention relates to the pasteurization of beer, near-beer, and similar malt beverages contained in bottles, and comprises means whereby bottles filled with beer and/or similar beverages may be automatically introduced into a pasteurizing chamber; circulated therein under different degrees of temperature preferably produced by flowing streams of water heated and/or cooled to the desired degree, and finally automatically discharged from said pasteurizing chamber and passed to other apparatus, labeling and packing mechanism for instance, without manual labor or the handling in any way of the bottles under the pasteurizing treatment. The bottles are maintained in an upright position while passing into and out of the pasteurizing chamber and while in the same they are carried on a circular moving table or platform which is slowly rotated while the bottles are maintained in an upright position; the point of entrance to the pasteurizing chamber being directly adjacent to the point of exit from said chamber so that the latter is practically closed during the pasteurizing treatment.

The pasteurizing chamber is provided with means for the delivery of sprays of water of various temperatures necessary to impart the desired temperatures to the contained beverages—starting with a relatively low temperature as the bottles are introduced; increasing to the higher temperature required for the greater period of time elapsing while the bottles are in the pasteurizing chamber, and gradually lowering as the filled bottles approach the point of exit.

An important feature of my invention resides in the provision of relatively small openings for the ingress and egress of the filled bottles; such openings needing to be only wide enough to accommodate traveling belts which serve to carry the bottles into and out of the pasteurizing chamber, and high enough to pass the bottles. By such arrangement heat losses are minimized.

These and other features of my invention are more fully described hereinafter; reference being had to the accompanying drawings, more or less diagrammatic, in which:

Fig. 3 is a sectional elevation on a larger scale taken on the line III—III, Fig. 1.

Fig. 4 is a sectional plan view taken on the line IV—IV, Fig. 3.

Fig. 5 is a fragmentary view of part of the pasteurizing structure, showing in elevation the inlet and outlet openings through which the filled bottles are passed, and Fig. 6 is a sectional view on the line VI—VI, Fig. 5.

Figure 2:
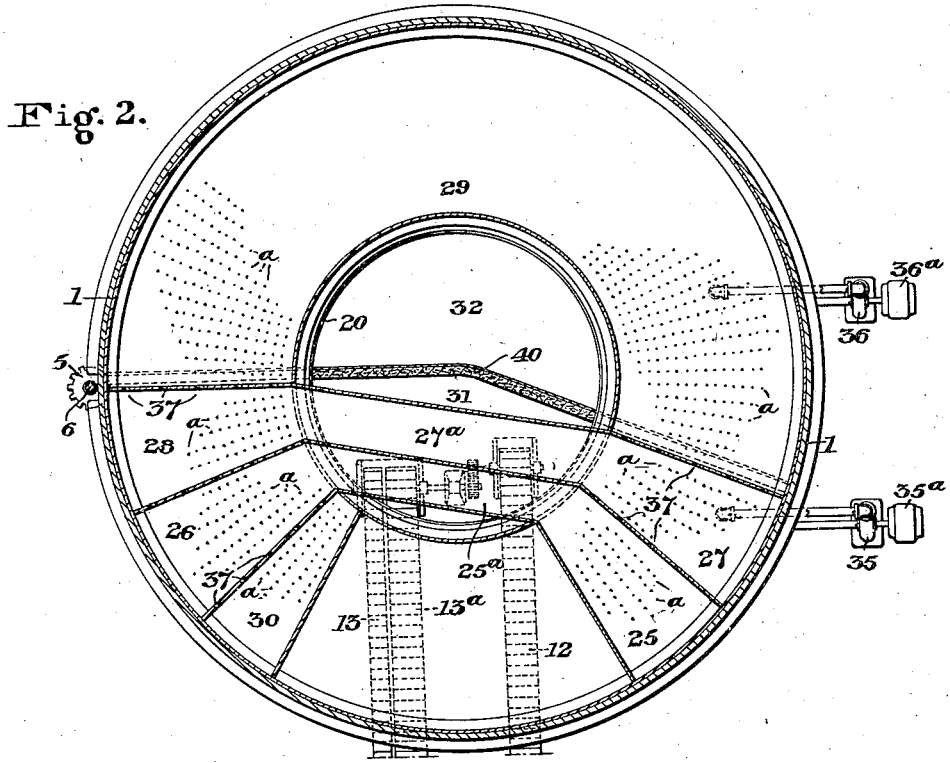
Fig. 2 is a sectional plan view, taken on the line II—II, Fig. 3.
Figure 1:
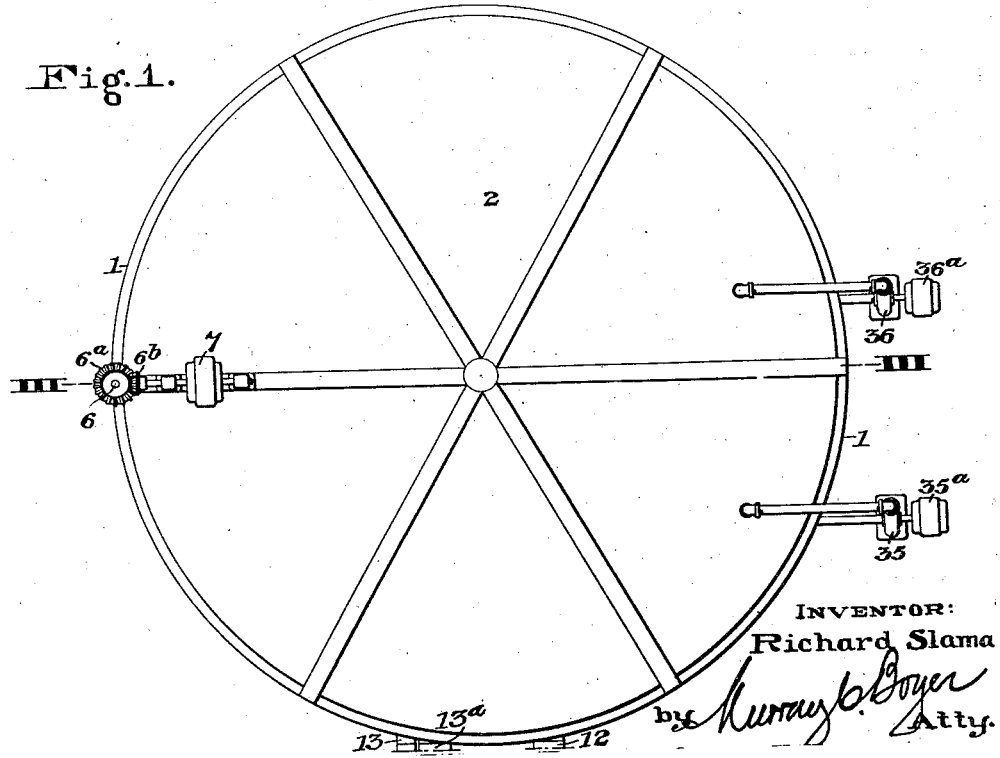
Figure 1 is a plan view of pasteurizing apparatus within the scope of my invention.

In the drawings, 1 represents the shell or casing of the pasteurizing chamber, which may be of any suitable material, sheet metal or the like, suitably secured together and circular in cross-sectional plan. The wall making up this shell or casing may have a layer of insulating material to conserve the heat.

The shell or casing 1 may be provided with a top 2 and bottom 3; the latter resting upon suitable supports $3^a$. As a whole it presents a cylindrical structure of suitable height to accommodate one or more tables or platforms 4 (one being shown in the present instance), upon which the filled bottles are arranged in an upright position. The platform or table 4 is arranged for rotation, and for such purpose it may have a toothed outer margin as indicated at $4^a$, for engagement by a driving pinion 5, carried by a vertical shaft 6, suitably mounted at the side of the casing, to which motion may be imparted through the bevel gears $6^a$ and $6^b$ from a motor 7, which may be mounted on the top 2 of said casing.

The platform or table 4 is circular in contour and may be provided with an annular rib 8 on its underside forming a rail for engagement with beveled rollers 9, suitably supported by shafts $9^a$ which may be mounted in bearings resting upon the bottom 3 of the pasteurizing structure.

This table is driven very slowly—making, approximately, one revolution per hour in apparatus of commercial size and, depending upon its size handling 3000 to 6000 or more bottles in such period. It will be understood, of course, that the speed of travel of this table will depend somewhat upon the size of the same and the number of bottles that may be placed thereon. At one side of the shell or casing 1, or at what may be termed the front of the same, I provide openings 10 and 11; the opening 10 serving as the inlet opening for the introduction of filled bottles in a vertical or standing position and the opening 11 serving as the exit opening for the finally pasteurized goods.

The openings 10 and 11 are relatively small, and in the lower part of the same I arrange traveling belts 12, and 13 and $13^a$; the inlet opening being provided with the single belt 12, and the exit opening being provided with a pair of belts 13 and $13^a$; the belt 13 being narrower than the belt $13^a$ and being driven at a slightly slower speed; the speed of the belt 13 being preferably the same as the speed of the belt 12 by which the bottles are introduced into the pasteurizing chamber. For the purpose of driving these several belts I provide a motor 14, which drives through gears 15, $15^a$ and $15^b$, the shafts 16 and 17, whereby motion is imparted directly to the belts 13 and $13^a$; the belt $13^a$ being driven at a speed slightly greater than the speed of the belt 13, which condition may be arranged by properly proportioning the size of the gears $15^a$ and $15^b$ receiving motion from the pinion 15 carried by the shaft of the motor 14.

At the opposite ends of the belts 13 and $13^a$, a shaft 18 is provided, having sprocket wheels engaging chains connected to these belts, and because the belt $13^a$ is driven at a speed differing from and greater than that of the belt 13, the wheel for the chain carrying the belt $13^a$ is loose on said shaft 18. The inner end of the chain carrying the belt 12 passes around a sprocket wheel fixed on a shaft 19, and this shaft is driven from the shaft 18 by means of the meshing gears $18^a$ and $19^a$ mounted on the shafts 18 and 19, respectively. The belts move in the direction of the arrows for the introduction and removal of the filled bottles, which may be delivered to the belt 12 from the filling and/or capping machine.

The pasteurizing chamber is provided with an inner annular wall 20, concentric with the wall 1, and this provides an internal annular chamber whose bottom is defined by the moving table or platform 4, and which may have end walls $20^a$ and $20^b$ aligned with the belts 12 and 13 spaced from said table or platform a distance sufficient to permit the bottles to pass. This wall 20 is cut through opposite the openings 10 and 11 for the accommodation of the belts 12, 13 and $13^a$, and provides space for the proper mounting of sprocket or chain wheels upon the shafts 18 and 19. A rail 21 is arranged adjacent to the left-hand side of the belt 12, and this rail is curved, as indicated at $21^a$, so that as the bottles are carried forward by the belt into the pasteurizing chamber, they will be edged off this belt by such curved rail and slide over an inclined plate 22 lying between the belt 12 and the slowly rotating table or platform 4. The rail 21 is continued around the inner wall of the pasteurizing chamber; being supported from the latter by brackets $21^b$, and it has a definite and abrupt change of contour, as indicated at $21^c$, so that the bottles may be delivered on to the moving table or platform 4 clear of that portion of the rail which extends around the inner side of the inner wall 20 of the pasteurizing chamber.

This change of contour serves to keep the bottles away from such rail and insures that the latter will not have any tendency to slow up their movement or cause them to bunch together and prevent proper massing of the bottles delivered by the belt 12 onto said table or platform 4. I also provide a rail 23, which may be carried by brackets $23^a$ mounted on the inner side of the outer wall of the casing 1 providing the pasteurizing chamber and against which the bottles may be directed, partly by slight centrifugal movement due to the rotation of said table or platform 4.

The wall space between the belts 12 and $13^a$ may be filled or not as desired; in the present instance a filling plate $20^c$ is shown. The space between the openings 10 and 11 may be closed by movable sections $1^a$ and $1^b$ which may be hinged at 24, with a depending portion $1^c$ which may be hinged at $24^a$ to one of said sections, so that access may be had to the interior of the structure.

For the purpose of providing the proper temperature within the pasteurizing chamber, I arrange below the top or cover 2 of the casing 1, a series of pans or chambers 25, 26, 27, 28, 29 and 30, which may be arranged in circular succession over the pasteurizing chamber, and to which water at varying degrees of temperature may be introduced; the bottom of such pans or chambers being perforated as indicated at $a$ so that water delivered thereto may pass from said pans or chambers in the form of rain or spray and fall upon the bottles being carried slowly around on the moving table or platform 4. This water after it passes from the table or platform 4 enters chambers 31 and 32 in the bottom of the structure below such table, from which it may be re-pumped to the series of pans or chambers above the pasteurizing chamber or, if reheating is required, it may be first passed to a reheater before being returned to the hot water pans in the upper part of the casing.

Pumps 35 and 36, which may be driven by individual motors $35^a$ and $36^a$, may be employed for circulating the water and it will be understood that the cooler water is circulated by one pump, that indicated at 35 for instance, while thhe pump 36 is employed for circulating the hot water. If desired, each pan may communicate with adjacent pans by providing perforations in the side walls of the same as indicated at 37. The pans 25 and 26 may contain water at a temperature substantially 90° F., and these pans may be in communication via a passage 25ª extending across the upper part of the casing. The pans 27 and 28 may contain water at a temperature substantially 110° to 115° F., and these pans may be in communication via a passage 27ª extending across the upper part of the casing. The pan 29 contains water whose temperature is at the pasteurizing point, 140° to 150° F., and this pan is of considerable extent; occupying approximately one-half of the space provided for the water baths and delivering this hotter water to the bottles while they are occupying the pasteurizing chamber for a period approximating one-half or more of the time allotted for the pasteurizing treatment. As will be noted, the bottles first pass under the supply of water at 90° F., then under the spray at 110° to 115° F.; their temperature being gradually raised so as to be ready for the higher and pasteurizing temperature of the water delivered from the pan or chamber 29, which may range from 140° to 150° F. From this temperature, the bottles have their temperature gradually lowered; passing from the higher temperature to the spray at substantially 110° to 115° F., thence to the spray at 90° F., and just before they leave the pasteurizing chamber they may be sprayed with water from the pan or chamber 30 which may receive water from the usual public supply, city water for instance, at a temperature which ranges about 60° F.

A diaphragm or partition 40 may be arranged within the inner space of the structure, between the wall 20 to conserve the heat as between the bodies of water at different temperatures, and this partition may be made of suitable insulating material; any felted body that will properly serve to retain the heat. It extends to the space in the bottom of the casing and underlies the traveling platform 4, substantially dividing such bottom space into the two chambers 31 and 32 for the reception of the bodies of water at different temperatures.

When the bottles have been subjected to the pasteurizing treatment, and have been sprayed with water from the pan 30, they will have reached a point adjacent to the exit opening 11, at which point I have provided the belts 13 and 13ª. An inclined plate 45 is here provided onto which the front bottles are pushed by those coming from behind, and from this plate 45 the bottles pass onto the belt 13. As a constant stream of bottles is flowing onto this belt from the rotating table or platform 4, they will be moved onto the faster belt 13ª which carries them away from the pasteurizing chamber and delivers them onto a suitable conveyer (not shown) from which they may pass to labeling and/or packing mechanism. The speed of the belt 13 is substantially that of the inlet belt 12, which may be or approximate about ten (10) feet per minute. The belt 13ª is preferably driven at a speed which may be or approximate about fifteen (15) feet per minute.

While I have shown a single movable table or platform 4, located in the present instance near the bottom of the structure, I may provide apparatus with other tables or platforms above the same and within the pasteurizing chamber; driven in the same manner and at the same speed, with sets of delivery and discharge belts arranged above those indicated at 12, 13 and 13ª in the drawings. In such instance, the water sprays will first encounter the upper layers or rows of bottles and will pass from the same to the bottles on the lower table or tables; the tables in such instance being fully perforated so as to permit proper discharge of the water delivering from the pans or chambers in the upper part of the casing or, when multiple tables or platforms are employed I may have separate water sprays for each table and separate receiving tanks for the waters of different temperature passing from such tables.

While I have shown certain specific forms of mechanism for carrying out the features of my invention, it will be understood that I do not wish to be limited thereto, and that my improved structure may be developed in other ways for the accomplishment of the desired pasteurizing treatment which involves automatic delivery of bottles in an upright position to a circular traveling table or platform; spraying the same with water baths at the desired temperatures, and automatic delivery of the bottles from the pasteurizing chamber without manual labor and without any handling.

I claim:

1. In a pasteurizing apparatus, the combination of a casing providing a pasteurizing chamber, a movable table or platform disposed within said chamber, means for rotating said table or platform, a belt for delivering bottles in an upright position to said table or platform, means for moving the bottles from said belt onto said table or platform, means for delivering streams of water at different temperatures to said bottles while they are being slowly moved by the table or platform, a plurality of belts for receiving said bottles from the moving table or platform and automatically discharging the same from the pasteurizing chamber, and means for synchronously driving said belts.

2. In a pasteurizing apparatus, the combination of a circular casing providing a pasteurizing chamber, a movable table or platform of circular form disposed within said chamber, means for rotating said table or platform, a belt for delivering bottles in an upright position to said table or platform, means for moving the bottles from said belt onto said table or platform, an inclined plate bridging the space between the belt and table, means for delivering streams of water at different temperatures to said bottles while they are being slowly moved by the table or platform, a plurality of belts for receiving said bottles from the moving table or platform and automatically discharging the same from the pasteurizing chamber; one of said latter belts moving at a greater speed than the other, and means for synchronously driving said belts.

3. In a pasteurizing apparatus, the combination of a casing providing an annular pasteurizing chamber, a movable table or platform disposed within the lower part of said chamber, rollers supporting said table or platform, means for rotating said table or platform, a belt for delivering bottles in an upright position to said table, means for diverting the bottles from said belt onto said table or platform, means for delivering streams of water at different temperatures to said bottles while they are being slowly moved by the table or platform, a plurality of belts for receiving said bottles from the moving table or platform and automatically discharging the same from the pasteurizing chamber, and a motor for driving all of said belts.

4. In a pasteurizing apparatus, the combination of a casing providing an annular pasteurizing chamber, a movable table or platform disposed within the lower part of said chamber, rollers supporting said table or platform, means for rotating said table or platform, a belt for delivering bottles in an upright position to said table, means for diverting the bottles from said belt onto said table or platform, an inclined plate bridging the space between the belt and table, means for delivering streams of water at different temperatures to said bottles while they are being slowly moved by the table or platform, a plurality of belts for receiving said bottles from the moving table or platform and automatically discharging the same from the pasteurizing chamber, a motor for driving all of said belts, and change gearing for effecting movement of one of said belts at a greater speed than the other.

5. In a pasteurizing apparatus of the character set forth in claim 1, an inclined plate bridging the space between the rotating table or platform and the slower moving of the pair of delivery belts.

6. In a pasteurizing apparatus of the character set forth in claim 1, a rail for effecting movement of the bottles from the inlet belt to the inclined bridging plate disposed between said belt and the moving table.

7. In a pasteurizing apparatus of the character set forth in claim 1, a rail for effecting movement of the bottles from the moving table to the outlet belts, and an inclined bridging plate disposed between said moving table and the slower of the outlet belts.

8. In a pasteurizing apparatus of the character set forth in claim 2, a rail disposed alongside the inlet belt and cooperating therewith so that bottles moved by said belt will engage said rail and be diverted by the same onto the inclined bridging plate disposed between said belt and the moving table for subsequent deposit on the latter, and a rail spaced from the outer wall of the pasteurizing chamber and overlying the outer edge of the moving table.

9. In a pasteurizing apparatus of the character set forth in claim 2, a rail for effecting movement of the bottles from the inlet belt to the inclined bridging plate between said belt and the moving table or platform; said rail having a sharp projecting portion whereby the bottles are diverted from contact with the rail carried by the inner wall of the pasteurizing chamber.

10. In a pasteurizing apparatus of the character set forth in claim 1, providing small inlet and outlet openings for the bottles for the purpose of more nearly completely closing the pasteurizing chamber, and providing the traveling belts for the automatic delivery of bottles to and from the moving table or platform of such pasteurizing chamber in the lower part of said openings.

11. In a pasteurizing apparatus of the character set forth in claim 1, providing small inlet and outlet openings for the bottles for the purpose of more nearly completely closing the pasteurizing chamber, providing hinged sections adjacent said openings permitting access to the interior of the structure, and providing the traveling belts for the automatic delivery of bottles to and from the moving table or platform of such pasteurizing chamber in the lower part of said openings.

In witness whereof I have signed this specification.

RICHARD SLAMA.